US005866650A

United States Patent [19]
Lawson et al.

[11] Patent Number: 5,866,650
[45] Date of Patent: Feb. 2, 1999

[54] COMPOSITION OF CYCLIC AMINE-INITIATED ELASTOMERS AND AMORPHOUS SILICA AND PROCESS FOR THE PRODUCTION THEREOF

[75] Inventors: David F. Lawson, Uniontown; Hideo Takeichi, Akron; William L. Hergenrother, Akron; Thomas J. Lynch, Akron; James Oziomek, Cuyahoga Falls, all of Ohio

[73] Assignee: Bridgestone Corporation, Tokyo, Japan

[21] Appl. No.: 893,868

[22] Filed: Jul. 11, 1997

[51] Int. Cl.$^6$ .............................. C08K 3/36; C08C 19/22
[52] U.S. Cl. .......................... 524/572; 524/492; 525/105; 525/332.3; 525/332.4; 525/370; 525/371; 525/375; 525/379; 525/382; 525/383; 525/384; 152/209 R
[58] Field of Search ................................... 524/572, 492, 524/493; 526/180; 525/236, 237, 342, 375, 105, 332.3, 332.4, 370, 371, 374, 379, 382, 383, 384; 152/209 R

[56] References Cited

U.S. PATENT DOCUMENTS

| | | | |
|---|---|---|---|
| 3,244,664 | 4/1966 | Zelinski et al. | 524/572 X |
| 3,439,049 | 4/1969 | Trepka | 260/624 |
| 4,015,061 | 3/1977 | Schulz et al. | 526/178 |
| 4,894,409 | 1/1990 | Shimada et al. | 524/492 |
| 4,914,147 | 4/1990 | Mouri et al. | 524/495 |
| 5,153,159 | 10/1992 | Antkowiak et al. | 502/155 |
| 5,268,413 | 12/1993 | Antkowiak et al. | 524/526 |
| 5,274,106 | 12/1993 | Lawson et al. | 548/300.1 |
| 5,329,005 | 7/1994 | Lawson et al. | 540/450 |
| 5,332,810 | 7/1994 | Lawson et al. | 540/450 |
| 5,354,822 | 10/1994 | Antkowiak et al. | 526/180 |
| 5,393,721 | 2/1995 | Kitamura et al. | 502/154 |
| 5,491,230 | 2/1996 | Lawson et al. | 540/450 |
| 5,496,940 | 3/1996 | Lawson et al. | 540/450 |
| 5,500,447 | 3/1996 | Lawson et al. | 524/571 |
| 5,502,131 | 3/1996 | Antkowiak et al. | 526/180 |
| 5,508,333 | 4/1996 | Shimizu | 524/424 |
| 5,519,086 | 5/1996 | Lawson et al. | 524/575 |
| 5,521,309 | 5/1996 | Antkowiak et al. | 540/612 |
| 5,536,801 | 7/1996 | Antkowiak et al. | 526/340 |
| 5,552,473 | 9/1996 | Lawson et al. | 524/575 |
| 5,552,499 | 9/1996 | Kitamura et al. | 526/174 |
| 5,574,109 | 11/1996 | Lawson et al. | 525/280 |
| 5,578,542 | 11/1996 | Lawson et al. | 502/167 |
| 5,610,237 | 3/1997 | Lawson et al. | 525/280 |

FOREIGN PATENT DOCUMENTS

| | | |
|---|---|---|
| 2184932 | 3/1997 | Canada . |
| 0 316 255 A2 | 5/1988 | European Pat. Off. . |
| 94106340 | 4/1994 | Japan . |

OTHER PUBLICATIONS

Rubber Technology, 3rd ed., Van Nostrand Reinhold, N.Y., pp. 86, 94 (1987).
Hackh's Chem. Dictionary, 4th ed., McGraw–Hill, N.Y., p. 331 (1969).

*Primary Examiner*—Fred M. Teskin
*Attorney, Agent, or Firm*—D. A. Thomas

[57] ABSTRACT

The reduction of hysteresis in a silica-filled, vulcanized elastomeric compound is produced by mixing diene monomer and optionally monovinyl aromatic monomer with a lithium amine initiator and, optionally, a modifier; effecting polymerization conditions; terminating polymerization with an amino group producing terminator to form an amine functionalized diene elastomer; compounding the amine functionalized diene elastomer with an amorphous silica filler and a vulcanization agent; and, effecting vulcanization. A pneumatic tire tread stock incorporating the vulcanized elastomer compound exhibits improved reduced hysteresis, or highly balanced wet traction, rolling resistance, snow/ice traction, and mechanical strength when compounded with silica filler and vulcanized, in the tire.

41 Claims, No Drawings

COMPOSITION OF CYCLIC AMINE-INITIATED ELASTOMERS AND AMORPHOUS SILICA AND PROCESS FOR THE PRODUCTION THEREOF

TECHNICAL FIELD

The subject invention relates to the composition of silica and anionically polymerized diene polymer and copolymer elastomers. More specifically, the present invention relates to anionic polymerization employing lithium amine initiators and various terminator compounds providing improved dispersion of silica in elastomeric compounds.

Silica filled compounds which include these functional diene polymers and copolymers prepared according to the present invention, have reduced hysteresis characteristics and improved balance of hysteresis properties with wet traction or snow and ice traction. Articles such as tires, power belts and the like, are typical applications with tires being particularly preferred.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomeric compound refers to the difference between the energy applied to deform an article made from the elastomeric compound and the energy released as the elastomeric compound returns to its initial, undeformed state. In pneumatic tires, lowered hysteresis properties are associated with reduced rolling resistance and heat build-up during operation of the tire. These properties, in turn, result in such desirable characteristics as lowered fuel consumption of vehicles using such tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Previous attempts at preparing reduced hysteresis products have focused upon increased interaction between the elastomer and the compounding materials such as carbon black, including high temperature mixing of the filler-rubber mixtures in the presence of selectively-reactive promoters to promote compounding material reinforcement, surface oxidation of the compounding materials, chemical modifications to the terminal end of polymers using 4,4'-bis (dimethylamino)benzophenone (Michler's ketone), tin coupling agents and the like and, surface grafting.

Various organolithium polymerization initiators are also known in the art. U.S. Pat. No. 3,439,049, owned by the Assignee of record, discloses an organolithium initiator prepared from a halophenol in a hydrocarbon medium.

U.S. Pat. No. 4,015,061 is directed toward amino-functional initiators which polymerize diene monomers to form mono- or di-primary aryl amine-terminated diene polymers upon acid hydrolysis. U.S. Pat. No. 4,914,147 discloses terminal modifying agents including dialkylamino-substituted aromatic vinyl compounds such as N,N'-dimethylamino benzophenone and p-dimethylamino styrene, in rubber compositions having reduced hysteresis characteristics. In U.S. Pat. No. 4,894,409, an amino group-containing monomer, such as 2-N,N-dimethylaminostyrene is polymerized to form an amino group-containing diene based polymer.

Other patents owned by the assignee of record, directed to amine-containing polymerization initiators and terminators include U.S. Pat. Nos. 5,238,893; 5,274,106; 5,329,005; 5,332,810; 5,393,721; 5,496,940; 5,508,333; 5,519,086; 5,521,309; 5,523,371; and 5,552,473. Lawson, et al., in *Anionic Polymerization of Dienes Using Homogeneous Lithium Amide (N—Li) Initiators*, ACS Preprint, Polymer Division, 37 (2) 1996, at page 728, disclosed that, for carbon black-filled compounds, cyclic amino lithium initiators of a certain size provided elastomeric compounds exhibiting reduced hysteresis.

Precipitated silica has been increasingly used as a reinforcing particulate filler in rubber components of tires and mechanical goods. The reason silica is used in tires is that silica allows one to improve the performance balance between wet traction and rolling resistance, snow/ice traction and, mechanical properties such as wear performance. Silica-loaded rubber stocks, however, have heretofore exhibited relatively poor resilience and high compound viscosity when used without any silane-coupling agent which is somewhat expensive to be widely used in the industry. Even with a certain amount of silane-coupling agent, total balance of the foregoing performances was often not sufficient.

The present invention provides initiators for anionic polymerization which become incorporated into the elastomer chain, as well as various terminators for the polymerization, and produce functional groups which greatly improve the dispersability of silica filler throughout the elastomeric composition during compounding. As will be described hereinbelow, these initiators contain amine groups.

This invention utilizes a combination of silica and polymer with amine producing initiators to increase dispersion of silica filler in diene polymer and copolymer elastomeric compounds, and to thereby reduce the hysteresis of the cured compounds or improve mechanical properties through the interaction (reinforcement) between silica and amine functionalities of the polymer. By this one could even reduce the amount of expensive silane-coupling agent.

SUMMARY OF INVENTION

It is therefore an object of the present invention to provide anionic polymerization initiators and terminators which improve the dispersion or reinforcement of silica filler in diene polymer elastomers.

It is another object of the present invention to provide a method for reducing the hysteresis of silica-filled elastomeric vulcanizable compounds.

It is another object of the present invention to provide vulcanizable silica-filled elastomeric compounds, which upon vulcanization, exhibit reduced hysteresis.

It is still another object of the present invention to provide an improved pneumatic tire having decreased rolling resistance.

It is yet another object of the present invention to provide an improved pneumatic tire having improved balance of wet traction, snow and ice traction, hysteresis properties and mechanical strength.

At least one or more of the foregoing objects, together with the advantages thereof over the existing art, which shall become apparent from the specification which follows, are accomplished by the invention as hereinafter described and claimed.

The present invention provides a process for the production of diene-based elastomeric compositions having improved reduced hysteresis, or highly balanced wet traction, rolling resistance, snow/ice traction, and mechanical strength when compounded with silica filler and vulcanized, the process comprising mixing a diene monomer and optionally a monovinyl aromatic monomer or a triene with a lithium amine initiator compound optionally in the presence of a modifier, wherein the lithium amine initiator compound is selected from the group consisting of compounds of the formulas R'—N—Li and R'—N—R"—Li wherein R' is a cyclic amine group having 3 to 18 ring carbon atoms and, together with the nitrogen, a ring of 4 to 19 atoms, and wherein R" is a divalent hydrocarbyl group of 2 to 20 carbons, wherein the lithium atom is not bonded to a carbon which is directly bonded to the amine nitrogen; effecting polymerization conditions; terminating polymerization with a terminating agent to form a functionalized diene elastomer; compounding the functionalized diene elastomer with an amorphous silica filler, and a vulcanization agent; and, effecting vulcanization of the silica filled, functionalized diene filled elastomeric compound.

The present invention further provides a vulcanizable silica-filled compound comprising a diene elastomer containing a lithium amine initiator-derived functionality and a functionality derived from a terminator, a silica filler, and a vulcanization agent, wherein the lithium amine initiator-derived functionality is a residue of a lithium amine initiator derived from a reaction of a secondary amine with a hydrocarbyl lithium and of the formula R'N—Li, wherein R' is a cyclic amine group having 3 to 18 ring carbon atoms and, together with the nitrogen, a ring of 4 to 19 atoms.

The present invention still further provides a vulcanizable silica-filled compound comprising a diene elastomer containing a lithium amine initiator-derived functionality and a functionality derived from a terminator, a silica filler, and a vulcanization agent, wherein the lithium amine initiator-derived functionality is a residue of a lithium-hydrocarbon substituted tertiary amine of the formula initiator derived from a reaction of a secondary amine with a hydrocarbyl lithium and of the formula R'N—R"—Li, wherein R' is a cyclic amine group having 3 to 18 ring carbon atoms and, together with the nitrogen, a ring of 4 to 19 atoms, and wherein R" is a divalent hydrocarbyl group of 2 to 20 carbons and the lithium atom is not bonded to a carbon which is directly bonded to the amine nitrogen.

The present invention further provides a vulcanizable silica-filled compound comprising a diene elastomer containing a lithium amine initiator-derived functionality and a functionality derived from a terminator, the terminator being devoid of an alkoxysilane group; a silica filler; and a vulcanization agent, wherein the lithium amine initiator-derived functionality is a residue of an initiator derived of the formula R'—N—R"—P—Li, wherein R' is a cyclic amine group having 3 to 18 ring carbon atoms and, together with the nitrogen, a ring of 4 to 19 atoms, wherein R" is a divalent hydrocarbyl group of 2 to about 20 carbons and wherein P is a diene-type oligomer having from 1 to about 100 diene monomer units, wherein the diene monomer is isoprene or 1,3-butadiene.

DETAILED DESCRIPTION OF THE PREFERRED EMBODIMENTS

In general, the present invention provides the obtainment of enhanced polymer filler interactions with silica, thereby providing vulcanizable elastomers for the manufacture of articles such a pneumatic tires having improved reduced hysteresis, or highly balanced wet traction, rolling resistance, snow/ice traction, and mechanical strength. This is accomplished by the use of cyclic amino containing initiators (i.e., lithium amine initiators) and, preferably, amino group producing terminators. By "amino group producing terminator" is meant a nitrogen containing precursor compound which acts as a terminator for a "living" diene polymer, and which after termination, contains or provides an amino group to form an amine functionalized diene elastomer. Such a combination of both cyclic amino containing initiators and amino group producing terminators has the advantage that the initiation will put a reactive group on almost all of the polymer chains and then any additional end capping during termination will give polymers having an increased level of reactivity towards silica filler when compared to conventionally initiated polymers modified only by termination.

The lithium amine initiators used in the present invention include lithium imides wherein a lithium atom is directly bonded to the nitrogen of a secondary amine or (lithium-hydrocarbyl) substituted amine wherein the lithium atom is directly bonded to a carbon which is part of a hydrocarbyl group which, in turn, is bonded to a nitrogen. Representative of the former (i.e., lithium bonded to nitrogen) are compounds of the structural formula R'N—Li, and of the latter (i.e., lithium bonded to a carbon), compounds of the structural formula R'N—R"—Li, wherein R' is bonded with the nitrogen to form a cyclic amine group, and R" is a divalent hydrocarbyl group preferably having 2 to 20 carbons. More particularly, R' may be bonded with the nitrogen to form a cyclic amine group preferably having 3 to 18 ring carbon atoms and, together with the nitrogen, preferably a ring of 4 to 19 atoms. An example of this cyclic amine group is a cyclic methylene ring of 4 to 18 methylene groups. It will be appreciated the R" may further include additional non-hydrocarbyl components within the structural formula. For example, R" may include morpholine or alkyl piperazine. In the latter formula, it will be appreciated that the lithium atom is preferably not bonded to a carbon which is directly bonded to the amine nitrogen, but rather, is separated by at least one, and more preferably, at least 3 carbon atoms.

The lithium amine initiators according to the present invention, are employed to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyl-toluenes and vinylnaphtalenes. The conjugated diene monomer and aromatic vinyl monomer are normally used at the weight ratios of about 90/10 to about 55/45, preferably about 80/20 to about 65/35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totaling 100 percent. The polymers and copolymers of the present invention may have the diene portion with a 1,2-microstructure contents ranging from about 10 to about 80 percent, with the preferred polymers or copolymers having 1,2-microstructure contents of from about 12 to about 65 percent. The molecular weight of the polymer that is produced according to the present invention, is preferably such that a proton-quenched sample will exhibit a gum Mooney viscosity ($ML_4/212°$ F.) of from about 10 to about 150. The copolymers are preferably random copolymers which result from simultaneous copolymerization of the monomers, as is known in the art.

The initiators containing cyclic amines, according to the present invention, preferably include N-lithiohexamethyleneimide, hexamethyleneiminopropyllithium, and lithiated adducts of cyclic amines, such as adducts of hexamethyleneimine with 1,3-butadiene, isoprene, 1-3-diisopropenylbenzene and ortho-xylene.

Still other lithium amine initiators include those compounds of the structural formula R'N—R"—P—Li, wherein R' is again a cyclic amine group having 3 to 18 ring carbon atoms and, together with the nitrogen, a ring of 4 to 19 atoms, R" is again a divalent hydrocarbyl group of 2 to 20 carbons, and P is a diene-type oligomer having 1 to 100 diene monomer units. Preferably, the diene monomer is selected from the group consisting of isoprene or 1,3-butadiene. It will be appreciated that, while oligomers typically do not include more than about 50 monomer units, the word "oligomer" has been used in this instance to denote the potential structure as having up to about 100 monomer units.

Polymerization is usually conducted in a conventional solvent for anionic polymerizations such as the various cyclic and acyclic hexanes, heptanes, octanes, pentanes, their alkylated derivatives, and mixtures thereof, as well as aromatic solvents such as benzene, t-butylbenzene, toluene, and the like. Other techniques for polymerization, such as semi-batch and continuous polymerization may be employed. In order to promote randomization in copolymerization and to increase vinyl content, a modifier may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator (modifier) employed.

Compounds useful as modifiers are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, di-piperidyl ethane, hexamethylphosphoramide, N-N'-dimethylpiperazine, diazabicyclooctane, diethyl ether, tributylamine and the like. Details of linear and cyclic oligomeric oxolanyl modifiers can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the modifier and the initiator. Alternatively, the monomer and modifier can be added to the initiator. The procedure is carried out under anhydrous, anaerobic conditions. The reactants are heated to a temperature of from about 10° to about 150° C. and are agitated for about 0.1 to 24 hours. After polymerization is complete, the product is removed from the heat and terminated in one or more ways.

To terminate the polymerization, a terminating agent, coupling agent or linking agent may be employed, all of these agents being collectively referred to herein as "terminating agents". Certain of these agents may provide the resulting polymer with a multifunctionality. That is, the polymers initiated according to the present invention, carry at least one amine functional group as discussed hereinabove, and may also carry a second functional group selected and derived from the group consisting of terminating agents, coupling agents and linking agents.

According to the present invention, useful terminating, coupling or linking agents include an amino producing group, exemplified by but not limited to the following: 4,4'-bis(dialkylamino)benzophenone (such as 4,4' (dimethylamino)-benzophenone or the like); N,N-dialkylamino-benzaldehyde (such as dimethylamino-benzaldehyde or the like); 1,3-dialkyl-2-imidazolidinones (such as 1,3-dimethyl-2-imidazolidinone or the like); 1-alkyl substituted pyrrolidinones; 1-aryl substituted pyrrolidinones; dialkyl- and dicycloalkyl-carbodiimides having from about 5 to about 20 carbon atoms;

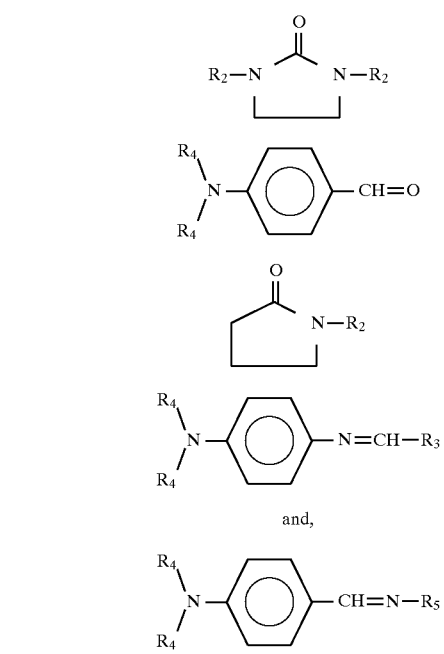

and, wherein each $R_2$ is the same or different and is an alkyl, cycloalkyl or aryl, having from 1 to about 12 carbon atoms. For example, $R_2$ may include methyl, ethyl, nonyl, t-butyl, phenyl or the like.

$R_3$ is an alkyl, phenyl, alkylphenyl or dialkylaminophenyl, having from 1 to about 20 carbon atoms. For example, $R_3$ may include t-butyl, 2-methyl-4-pentene-2-yl, phenyl, p-tolyl, p-butylphenyl, p-dodecylphenyl, p-diethyl-aminophenyl, p-(pyrrolidino) phenyl, and the like.

Each $R_4$ is the same or different, and is an alkyl or cycloalkyl having from 1 to about 12 carbon atoms. Two of the $R_4$ groups may together form a cyclic group. For example, $R_4$ may include methyl, ethyl, octyl, tetramethylene, pentamethylene, cyclohexyl or the like.

$R_5$ may include alkyl, phenyl, alkylphenyl or dialkylaminophenyl, having from 1 to about 20 carbon atoms. For example, $R_5$ may include methyl, butyl, phenyl, p-butylphenyl, p-nonylphenyl, p-dimethylaminophenyl, p-diethylaminophenyl, p-(piperidino)phenyl, or the like.

Other useful terminating agents may include those of the structural formula $(R_1)_a ZX_b$, wherein Z is tin or silicon. It is preferred that Z is tin, and when it is, $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_1$ may include methyl, ethyl, n-butyl, neophyl, phenyl, cyclohexyl or the like. When Z is tin, X is a halogen such as chlorine or bromine, or an alkoxy, "a" is from 0 to 3, and "b" is from about 1 to 4; where a+b=4. Examples of such terminating agents include tin tetrachloride, $(R_1)_3 SnCl$, $(R_1)_2 SnCl_2$, $R_1 SnCl_3$, $R_1 Sn(OR_1)_3$ and $(R_1)_2 Sn(OR)_2$.

When Z is silicon, then $R_1$ is again an alkyl having from 1 to 20 carbon atoms, a cycloalkyl having from about 3 to about 20 carbon atoms; an aryl having from about 6 to about 20 carbon atoms; or, an aralkyl having from about 7 to about 20 carbon atoms. That is, $R_1$, may again be methyl, ethyl, n-butyl, neophyl, phenyl, cyclohexyl or the like. X in the formula provided hereinabove is only a halogen, such as chlorine or bromine when Z is silicon. That is, alkoxysilanes, $Si(OR)_x$ wherein R is an alkyl, cycloalkyl, aryl, or aralkyl, are particularly excluded. In fact, it is preferred that the terminating agent be devoid of any alkoxysilane groups. Examples of desirable terminating agents include $R_1 SiCl_3$, $(R_1)_2 SiCl_2$, $(R_1)_3 SiCl$ and silicon tetrachloride.

Examples of additional terminating agents include water, steam, an alcohol such as isopropanol, carbodiimides, N-methylprrolidinone, cyclic amides, cyclic ureas, isocyanates, Schiff bases, 4,4'-bis(diethylamino) benzophenone, and the like.

The terminating agent is added to the reaction vessel, and the vessel is agitated for about 1 to about 1000 minutes. As a result, an elastomer is produced having an even greater affinity for silica compounding materials, and hence, even further reduced hysteresis. Additional examples of terminating agents include those found in U.S. Pat. No. 4,616,069 which is herein incorporated by reference. It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 120° C. to ensure complete reaction. Polymers terminated with a functional group as discussed hereinabove, are subsequently quenched with alcohol or other quenching agent as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The functional group or groups contained in the elastomer of this invention have an affinity for silica. Such compounding results in products exhibiting reduced hysteresis, which means a product having increased rebound, decreased rolling resistance and having lessened heat build-up when subjected to mechanical stress or highly balanced wet traction, rolling resistance, snow/ice traction and mechanical strength. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires.

The polymers of the present invention can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely in a range comprising about 10 to about 99 percent by weight of the total rubber. It is to be appreciated that the minimum amount will depend primarily upon the degree of reduced hysteresis or performance balance that is desired.

According to the present invention, amorphous silica (silicon dioxide) is utilized as a filler for the elastomer. Silicas are generally classed as wet-process, hydrated silicas because they are produced by a chemical reaction in water, from which they are precipitated as ultrafine, spherical particles. Silica filler has found limited use in the past, however, because it is acidic in nature and interferes with the cure process. Compensation for this phenomenon has been required.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of polymer (phr), preferably in an amount from about 5 to above 80 phr. The useful upper range is limited by the high viscosity imparted by fillers of this type. Some of the commercially available silicas which may be used include: Hi-Sil® 190, Hi-Sil® 215, and Hi-Sil® 233, produced by PPG Industries. Also, a number of useful commercial grades of different silicas are available from De Gussa Corporation, Rhone Poulenc, and J.M. Huber Corporation.

The polymers may also be compounded with all forms of carbon black in amounts ranging from about 0 to about 50 parts by weight, per 100 parts of rubber (phr), with less than about 5 phr being preferred. The carbon blacks may include any of the commonly available, commercially-produced carbon blacks but those having a surface area (EMSA) of at least 20 $m^2$/gram and more preferably at least 35 $m^2$/gram up to 200 m²/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the TABLE I hereinbelow.

TABLE I

Carbon Blacks

| ASTM Designation (D-1765-82a) | Surface Area (m²/g) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black, silica, and other conventional rubber additives including for example, fillers, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance, or improved balance of snow and ice traction and wet traction. In other words, these polymers used in the presence of silica filler provide for obtaining compositions for pneumatic tires and the like which compositions have improved reduced hysteresis, or highly balanced wet traction, rolling resistance, snow/ice traction, and mechanical strength when compounded with silica filler and vulcanized, in the tire.

GENERAL EXPERIMENTAL

In order to demonstrate the preparation and properties of elastomeric compositions prepared according to the present invention, several diene elastomers were prepared according to the above disclosure. Cyclic amine initiators were used to form styrene butadiene rubber (SBR) formulations used in the preparation of silica filled samples, and these samples were compared against control samples described hereinbelow. As noted above, various techniques known in the art for carrying out polymerizations may be used with the inventive cyclic amine initiator-terminator-silica filler combination, without departing from the scope of the present invention.

The polymerizations were carried out as is well known in the art. At least one formulation was prepared according to the following procedure. The polymerization was conduct in a jacketed stainless steel pressure reactor under a blanket of dry nitrogen. The pressure in the reactor was maintained between 40 and 70 psi during the course of the polymerization. The reactor was first charged with a 24–26 wt % solution of butadiene in hexane. Following the addition of butadiene, a 33 wt % solution of styrene in hexane was added. The monomer blend was agitated while the modifier and initiator components were added. The polymerization was initiated at or near room temperature. The temperature of the polymerization was regulated such that the highest temperature recorded during the polymerization was below 135° F.

The copolymers were stabilized with an antioxidant. The copolymers were isolated by adding the cements to an excess of isopropanol followed by drum drying. These copolymers were compounded into one of six formulations. The main reinforcing filler in all of these formulations was silica, although carbon black was included in some samples. The formulations of the present invention are described in Table II.

TABLE II

Cure Formulations for Experimental Compositions

| | Sample No. | | |
|---|---|---|---|
| | A | B | C |
| Copolymer | 75 | 75 | 75 |
| Natural Rubber | 25 | 25 | 25 |
| Silica | 50 | 30 | 60 |
| Wax | 1 | — | — |
| Carbon Black (HAF) | — | 35 | 6 |
| Antioxidant | 0.95 | 0.95 | 0.95 |
| Aromatic Oil | 15 | 6 | 4 |
| Naphthenic Oil | — | 15 | 15 |
| Silane Coupling Agent | — | 1 | 2 |
| Stearic Acid | 1.5 | 1.5 | 1.5 |
| Sulfur cure package | 4.3 | 4.85 | 5.25 |
| Zinc Oxide | 3 | 3 | 3 |

For the polymerization of Sample No. A, the modifier was added first, butyllithium (BuLi) was added second and the secondary amines such as hexamethyleneimine was added last. The butyllithium and secondary amine reacted in situ to form the lithium imide initiator, namely N-lithiohexamethyleneimine. The exact amounts of monomer, initiator and modifier used in these polymerization are reported in Table IIIA, and are compared with Example C-I through C-III wherein only butyllithium and a modifier were used to prepare the polymer.

TABLE IIIA

| Example No. | C-1 | 1 | C-2 | 2 | C-3 | 3 |
|---|---|---|---|---|---|---|
| BuLi (mmol) | 4.78 | 5.21 | 25.2 | 4.59 | 14.7 | 4.78 |
| HMI (mmol) | | 4.69 | | 4.13 | | 4.3 |
| Randomizer (mmol) | 1.19 | 1.15 | 6.56 | 1.01 | 3.67 | 1.05 |

TABLE IIIA-continued

| Example No. | C-1 | 1 | C-2 | 2 | C-3 | 3 |
|---|---|---|---|---|---|---|
| Butadiene (grams) | 430 | 430 | 2148 | 430 | 1323 | 430 |
| Styrene (grams) | 143 | 143 | 755 | 143 | 441 | 143 |
| wt. % monomer | 25.3 | 25.3 | 25.6 | 25.3 | 25.9 | 25.3 |
| Time (hrs) | 2 | 2.5 | 2.5 | 3 | 3 | 3 |
| Temp. (°F.) (start/max) | 85/130 | 85/120 | 76/125 | 80/120 | 80/125 | 80/130 |
| % styrene | 25 | 25 | 26 | 25 | 25 | 25 |
| Reactor Size (gal) | 1 | 1 | 5 | 1 | 5 | 1 |
| Batch size (lbs) | 5 | 5 | 25 | 5 | 15 | 5 |

BuLi: Butyl Lithium
HMI: Hexamethyleneimine

TABLE IIIB

| Example No. | C-1 | 1 | C-2 | 2 | C-3 | 3 |
|---|---|---|---|---|---|---|
| % solids (theory) | 25.3 | 25.3 | 25.6 | 25.3 | 25.9 | 25.3 |
| % solids (found) | | | 24.0 | | | |
| $ML_{(1+4)}$ | 14 | 14 | 18 | 18 | 41 | 33 |
| Mn ($\times 10^{-3}$ g/mol, theory) | 120 | 110 | 115 | 125 | 120 | 120 |
| Mn ($\times 10^{-3}$ g/mol) | 104 | 98 | 130 | 116 | 121 | 129 |
| Mw ($\times 10^{-3}$ g/mol) | 110 | 109 | 139 | 123 | 131 | 139 |
| PDI | 1.06 | 1.11 | 1.07 | 1.06 | 1.08 | 1.22 |
| % vinyl | 44 | 44 | 53 | 46 | 33 | 45 |
| Tg (°C.) | −44 | −44 | −34 | −42 | −58 | −43 |

BuLi: Butyl Lithium
LHMI: N-Lithio-hexamethyleneimine

TABLE IIIC

| Example No. | C-1 | 1 | C-2 | 2 | C-3 | 3 |
|---|---|---|---|---|---|---|
| $ML_{(1+4)}$ | 90 | 88 | 86 | 85 | 92 | 102 |
| tan δ at 7% strain (65° C.) | 0.053 | 0.055 | 0.046 | 0.053 | 0.066 | 0.051 |
| % Rebound (65° C.) | 62 | 68 | 62 | 69 | 63 | 69 |
| ΔG' (65° C., MPa) | 9.45 | 7.89 | 9.40 | 7.35 | 8.31 | 7.37 |
| 300% Modulus (psi) | 753 | 824 | 814 | 894 | 736 | 893 |
| % strain at Max | 536 | 526 | 497 | 517 | 580 | 523 |

Table IIIB further characterizes the polymer as prepared and shown in Table IIIA. Table IIIC shows various physical properties for comparison purposes. Thus, it will be appreciated that Examples 1, 2, and 3 demonstrate embodiments of the present invention, while Examples C-1, C-2, and C-3 provide controls for comparison of the prior art. It can readily be recognized that the present invention, involving the preparation of a silica-filled, particularly amorphous silica-filled, elastomeric composition utilized a cyclic amine initiator result in a marked reduction of hysteresis in the cured compounds. This is demonstrated in all of the inventive examples, by the ΔG' values.

Not all lithium amines used as initiators produce an elastomer with reduced hysteresis for carbon black filled rubber stocks, it can be concluded that the interaction between the polymer amine functionality and the silica fillers are some what different from the interactions between the polymer amine functionality and the carbon black fillers.

In the preparation of the polymers used for cure formulations B and C, N-lithiohexamethyleneimine was used as the initiator and the polymers were then terminated or ended with a tin coupler namely, tin tetrachloride. At least sample B was compounded and compared to a silica-filled rubber stock which included a polymer that had only been end-linked by tin tetrachloride and which included full levels of a silane coupling agent (3 phr) as compared to the present invention which included a reduced level of silane coupling agent (1 phr) the weight ratio of the functional polymer to silica in the formulation was maintained at about 2:1, although ranges about 0.25/1 to 5/1 maybe suitable. Table IV provide the physical properties of the compositions of the present invention (Example 4–6) as compared to a control composition having a full level of silane coupling agent (C-4). The results achieved in the composition of the present invention can be summarized in the hysteresis properties, represented in Table IV by tan δ at 50° C., and in the tire data by rolling loss, the wear resistance shown in the Table IV by the Lambourne abrasion indices, and in the tire data and the wet and dry traction of the compounds. These results are listed in Table IV hereinbelow.

TABLE IV

| | Example No. | | | |
|---|---|---|---|---|
| | C-4 | 4 | 5 | 6 |
| Functionality | BuLi/Sn | HMI/Sn | HMI/Sn | HMI/Sn |
| Formulation (Table II) | B | B | B | C |
| Additive (phr) | silane/3 | silane/1 | silane/1 | silane/2 |
| $ML_4$/130° C. | 57 | 59 | 53 | 59 |
| Stress Strain 25° C. | | | | |
| 50% Modulus (psi) | 210 | 190 | 180 | 211 |
| 300% Modulus (psi) | 1910 | 1450 | 1770 | 1710 |
| Tensile (psi) | 2320 | 2080 | 2290 | 2350 |
| Lambourn Abrasion | | | | |
| 25% index | 100 | 123 | 114 | 89 |
| 65% index | 100 | 114 | 117 | 94 |
| Dynastat | | | | |
| M', 50° C. (MPa) | 6.6 | 7.4 | 5.7 | 18.8 |
| tan δ | 0.109 | 0.119 | 0.09 | 0.086 |
| M', 0° C. (MPa) | 9.1 | 10.9 | 7.8 | 26 |
| tan δ | 0.183 | 0.211 | 0.173 | 0.143 |
| Tire Data | | | | |
| Rolling Loss Z9G (N) | 31.86 | 31.77 | 30.72 | — |
| Dry Traction | 100 | 100 | 101 | — |
| Wet Traction | 100 | 100 | 98 | — |

Thus it should be evident that the cyclic amine initiators and process of the present invention are highly effective in providing enhanced interactions between the polymer and silica fillers. The invention is particularly suited for the preparation of vulcanizable elastomers for tires, but is necessarily limited thereto.

Based upon the foregoing disclosure, it should now be apparent that the use of the cyclic amine initiators and process described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A process for the production of diene-based elastomeric compositions having improved reduced hysteresis, or highly balanced wet traction, rolling resistance, snow/ice traction, and mechanical strength when compounded with silica filler and vulcanized, the process comprising:

mixing a diene monomer and optionally a monovinyl aromatic monomer or a triene with a lithium amine initiator compound optionally in the presence of a modifier, wherein the lithium amine initiator compound is selected from the group consisting of compounds of the formulas R'—N—Li and R'—N—R"—Li wherein R' is a cyclic amine group having 3 to 18 ring carbon atoms and, together with the nitrogen, a ring of 4 to 19 atoms, and wherein R" is selected from the group consisting of a divalent hydrocarbyl group of 2 to 20 carbons, morpholine and alkyl piperazine, wherein the lithium atom is not bonded to a carbon which is directly bonded to the amine nitrogen;

effecting polymerization conditions;

terminating polymerization with a terminating agent to form a functionalized diene elastomer, wherein the terminating agent is devoid of any alkoxysilane, aryloxysilane and aralkyloxysilane groups;

compounding the functionalized diene elastomer with an amorphous silica filler, and a vulcanization agent; and, effecting vulcanization of the silica filled, functionalized diene filled elastomeric compound.

2. A process as in claim 1, wherein R' is a cyclic methylene ring of 4 to 18 methylene groups.

3. A process as in claim 1, wherein R" is a $C_{3-8}$ divalent alkylene wherein the nitrogen and lithium atoms are separated by at least 3 carbon atoms.

4. A process as in claim 1, wherein the lithium amine initiator is selected from the group consisting of compounds of the formulas R'N—(CH$_2$)$_n$—Li, (CH$_2$)$_m$N—Li and (CH$_2$)$_m$N—(CH$_2$)$_n$—Li, wherein R' is selected from the group consisting of a cyclic amine group having 6 to 12 carbon atoms and an alkyl cyclic amine group having 6 to 12 carbon atoms, wherein m is an integer from 4 to 18 and wherein n is an integer from 2 to 20.

5. A process for the production of diene-based elastomeric compositions having improved reduced hysteresis, or highly balanced wet traction, rolling resistance, snow/ice traction, and mechanical strength when compounded with silica filler and vulcanized, the process comprising:

mixing a diene monomer and optionally a monovinyl aromatic monomer or a triene with a lithium amine initiator compound optionally in the presence of a modifier, wherein the lithium amine initiator compound is selected from the group consisting of compounds of the formula R'N—R"—P—Li, wherein P is a diene-type oligomer having 1 to 100 diene monomer units, and wherein the diene monomer is isoprene or 1,3-butadiene, wherein R' is a cyclic amine group having 3 to 18 ring carbon atoms and, together with the nitrogen, a ring of 4 to 19 atoms, and wherein R" is selected from the group consisting of a divalent hydrocarbyl group of 2 to 20 carbons; morpholine and alkyl piperazine;

effecting polymerization conditions;

terminating polymerization with a terminating agent to form a functionalized diene elastomer, wherein the terminating agent is devoid of any alkoxysilane, aryloxysilane and aralkyloxysilane groups;

compounding the functionalized diene elastomer with an amorphous silica filler, and a vulcanization agent; and, effecting vulcanization of the silica filled, functionalized diene filled elastomeric compound.

6. A process as in claim 1, wherein the lithium amine initiator is selected from the group consisting of N-lithiohexamethyleneimide, hexamethyleneiminopropyllithium, and lithiated adducts of cyclic amines.

7. A process as in claim 6, wherein the lithiated adducts of cyclic amines include adducts of hexamethyleneimine with 1,3-butadiene, isoprene, 1,3-diisopropenylbenzene or ortho-xylene.

8. A process as in claim 1, wherein the step of terminating employs an amino group producing terminator to form an amine functionalized diene elastomer.

9. A process as in claim 8, wherein the amino group producing terminator is selected from the group consisting of 4,4'-bis(dialkylamino)benzophenone; N,N-dialkylaminobenzaldehyde; 1,3-dialkyl-2-imidazolidinones; 1-alkyl substituted pyrrolidinones; 1-aryl substituted pyrrolidinones; dialkyl- and dicycloalkyl-carbodiimides having from about 5 to about 20 carbon atoms;

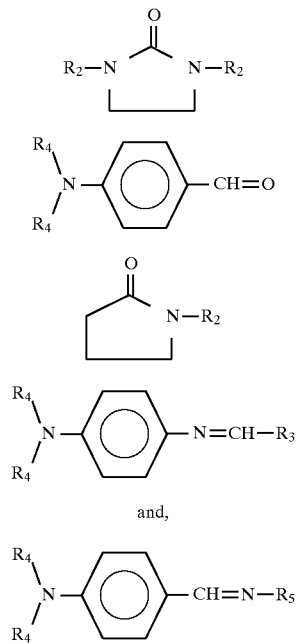

and,

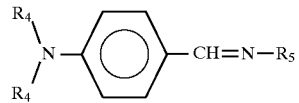

wherein each $R_2$ is the same or different and is an alkyl, cycloalkyl ar aryl, having from 1 to about 12 carbon atoms; $R_3$ is an alkyl, phenyl, alkylphenyl or dialkylaminophenyl, having from 1 to about 20 carbon atoms; each $R_4$ is the same or different, and is an alkyl or cycloalkyl having from 1 to about 12 carbon atoms; and wherein two of the $R_4$ groups may together form a cyclic group; $R_5$ is alkyl, phenyl, alkylphenyl or dialkylaminophenyl, having from 1 to about 20 carbon atoms.

10. A process as in claim 1, wherein the step of terminating employs a terminator having the structural formula, $(R_1)_aZX_b$; wherein Z is tin; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen or alkoxy, a is an integer from 0 to 3, and b is an integer from 1 to 4, where a+b=4.

11. A process as in claim 1, wherein the step of terminating employs a terminator having the structural formula, $(R_1)_aZX_b$; wherein Z is silicon; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen, a is an integer from 0 to 3, and b is an integer from 1 to 4; where a+b=4.

12. A process as in claim 9, including terminating polymerization with an additional terminator selected from the group consisting of water, steam, an alcohol, carbodiimides, N-methylprrolidinone, cyclic amides, cyclic ureas, isocyanates, Schiff bases, 4,4'-bis(diethylamino) benzophenone, and mixtures thereof, wherein each R' is the same or different and is an alkyl, having from 1 to about 20 carbon atoms; a cycloalkyl having from about 3 to about 20 carbon atoms; an aryl having from about 6 to about 20 carbon atoms; or an aralkyl having from about 7 to about 20 carbon atoms.

13. A process as in claim 10, wherein each $R_1$ is the same or different and is methyl, ethyl, butyl, octyl, cyclohexyl, 3-phenyl-1-propyl, isobutyl, and mixtures thereof.

14. A process as in claim 1, wherein the silica filler has a surface area of about 32 to about 400 m2/g.

15. A process as in claim 1, wherein the silica filler has a pH in the range of about 5.5 to about 7.

16. A process as in claim 1, including compounding the amine functionalized diene elastomer with carbon black.

17. A vulcanizable silica-filled compound comprising a diene elastomer containing a lithium amine initiator-derived functionality and a functionality derived from a terminator devoid of alkoxysilane, aryloxysilane and aralkyloxysilane groups, an amorphous silica filler, and a vulcanization agent, wherein the lithium amine initiator-derived functionality is a residue of a lithium amine initiator derived from a reaction of a secondary amine with a hydrocarbyl lithium and of the formula R'N—Li, wherein R' is a cyclic amine group having 3 to 18 ring carbon atoms and, together with the nitrogen, a ring of 4 to 19 atoms.

18. The vulcanizable silica-filled compound of claim 17, wherein the elastomer is selected from the group consisting of conjugated diene polymers and copolymers thereof prepared from monomers selected from the group consisting of monovinyl aromatic monomers and trienes.

19. The vulcanizable silica-filled compound of claim 17, wherein R' is a cyclic methylene ring of 4 to 18 methylene groups.

20. The vulcanizable silica-filled compound of claim 17, wherein the lithium amine initiator is N-lithiohexamethyleneimide.

21. The vulcanizable silica-filled compound of claim 17, wherein the terminator functionality is an amino containing functionality and the amino containing functionality is a residue of an amino group producing terminator is selected from the group consisting of 4,4'-bis(dialkylamino) benzophenone; N,N-dialkylamino-benzaldehyde; 1,3-dialkyl-2-imidazolidinones; 1-alkyl substituted pyrrolidinones; 1-aryl substituted pyrrolidinones; dialkyl- and dicycloalkyl-carbodiimides having from about 5 to about 20 carbon atoms;

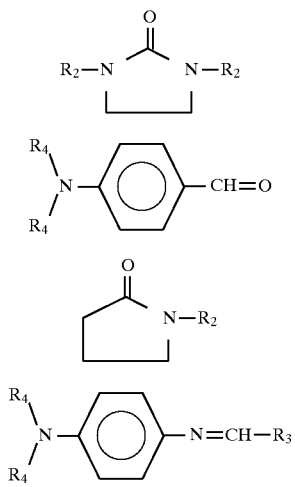

-continued
and,

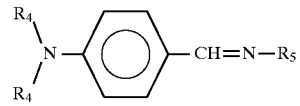

wherein each $R_2$ is the same or different and is an alkyl, cycloalkyl ar aryl, having from 1 to about 12 carbon atoms; $R_3$ is an alkyl, phenyl, alkylphenyl or dialkylaminophenyl, having from 1 to about 20 carbon atoms; each $R_4$ is the same or different, and is an alkyl or cycloalkyl having from 1 to about 12 carbon atoms; and wherein two of the $R_4$ groups may together form a cyclic group; $R_5$ is alkyl, phenyl, alkylphenyl or dialkylaminophenyl, having from 1 to about 20 carbon atoms.

22. The vulcanizable silica-filled compound of claim 17, wherein the terminator functionality is a residue of a terminator having the structural formula, $(R_1)_a ZX_b$; wherein Z is silicon; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen, a is an integer from 0 to 3, and b is an integer from [about] 1 to 4; where a+b=4.

23. The vulcanizable silica-filled compound of claim 17, wherein the terminator functionality is a residue of a terminator having the structural formula, $(R_1)_a ZX_b$; wherein Z is tin; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen or alkoxy, a is an integer from 0 to 3, and b is an integer from 1 to 4, where a+b=4.

24. The vulcanizable silica-filled compound of claim 17, wherein the silica filler has a surface area of about 32 to about 400 m2/g.

25. The vulcanizable silica-filled compound of claim 17, wherein the silica filler has a pH in the range of about 5.5 to about 7.

26. The vulcanizable silica-filled compound of claim 17, including compounding the amine functionalized diene elastomer with carbon black.

27. A pneumatic tire having decreased rolling resistance comprising tread stock vulcanized from the vulcanizable silica-filled compound of claim 17.

28. A vulcanizable silica-filled compound comprising a diene elastomer containing a lithium amine initiator-derived functionality and a functionality derived from a terminator devoid of alkoxysilane, aryloxysilane and aralkyloxysilane groups, an amorphous silica filler, and a vulcanization agent, wherein the lithium amine initiator-derived functionality is a residue of a lithium-hydrocarbon substituted tertiary amine of the formula R'N—R"—Li, wherein R' is a cyclic amine group having 3 to 18 ring carbon atoms and, together with the nitrogen, a ring of 4 to 19 atoms, and wherein R" is selected from the group consisting of a divalent hydrocarbyl group of 2 to 20 carbons, morpholine and alkyl piperazine, and the lithium atom is not bonded to a carbon which is directly bonded to the amine nitrogen.

29. The vulcanizable silica-filled compound of claim 28, wherein the elastomer is selected from the group consisting of conjugated diene polymers and copolymers thereof prepared from monomers selected from the group consisting of monovinyl aromatic monomers and trienes.

30. The vulcanizable silica-filled compound of claim 28, wherein R' a cyclic methylene ring of 4 to 18 methylene groups.

31. The vulcanizable silica-filled compound of claim 28, wherein R" is a $C_{3-8}$ divalent alkylene wherein the nitrogen and lithium atoms are separated by at least 3 carbon atoms.

32. The vulcanizable silica-filled compound of claim 28, wherein the lithium amine initiator is selected from the group consisting of hexamethyleneiminopropyllithium and lithiated adducts of cyclic amines.

33. The vulcanizable silica-filled compound of claim 32, wherein the lithiated adducts of cyclic amines include adducts of hexamethyleneimine with 1,3-butadiene, isoprene, 1,3-diisopropenylbenzene or ortho-xylene.

34. The vulcanizable silica-filled compound of claim 28, wherein the terminator functionality is an amino containing functionality and the amino containing functionality is a residue of an amino group producing terminator is selected from the group consisting of 4,4'-bis(dialkylamino) benzophenone; N,N-dialkylamino-benzaldehyde; 1,3-dialkyl-2-imidazolidinones; 1-alkyl substituted pyrrolidinones; 1-aryl substituted pyrrolidinones; dialkyl- and dicycloalkyl-carbodiimides having from about 5 to about 20 carbon atoms;

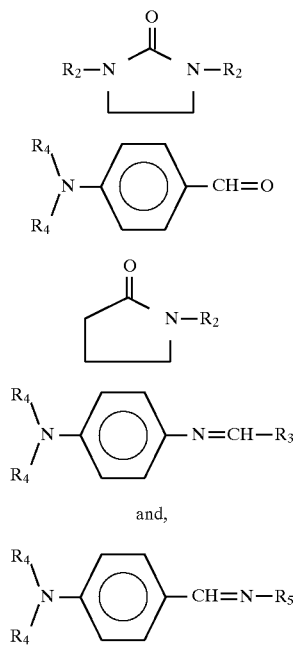

and, wherein each $R_2$ is the same or different and is an alkyl, cycloalkyl ar aryl, having from 1 to about 12 carbon atoms; $R_3$ is an alkyl, phenyl, alkylphenyl or dialkylaminophenyl, having from 1 to about 20 carbon atoms; each $R_4$ is the same or different, and is an alkyl or cycloalkyl having from 1 to about 12 carbon atoms; and wherein two of the $R_4$ groups may together form a cyclic group; $R_5$ is alkyl, phenyl, alkylphenyl or dialkylaminophenyl, having from 1 to about 20 carbon atoms.

35. The vulcanizable silica-filled compound of claim 28, wherein the terminator functionality is a residue of a terminator having the structural formula, $(R_1)_a ZX_b$; wherein Z is silicon; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen, a is an integer from 0 to 3, and b is an integer from 1 to 4; where a+b=4.

36. The vulcanizable silica-filled compound of claim 28, wherein the terminator functionality is a residue of a terminator having the structural formula, $(R_1)_a ZX_b$; wherein Z is tin; $R_1$ is an alkyl having from 1 to about 20 carbon atoms; a cycloalkyl having from about 3 to about 20 carbon atoms; an aryl having from about 6 to about 20 carbon atoms; or, an aralkyl having from about 7 to about 20 carbon atoms; X is a halogen or alkoxy, a is an integer from 0 to 3, and b is an integer from 1 to 4, where a+b=4.

37. The vulcanizable silica-filled compound of claim 26, wherein the silica filler has a surface area of about 32 to about 400 m2/g.

38. The vulcanizable silica-filled compound of claim 28, wherein the silica filler has a pH in the range of about 5.5 to about 7.

39. The vulcanizable silica-filled compound of claim 28, including compounding the amine functionalized diene elastomer with carbon black.

40. A pneumatic tire having decreased rolling resistance comprising tread stock vulcanized from the vulcanizable silica-filled compound of claim 28.

41. A vulcanizable silica-filled compound comprising a diene elastomer containing a lithium amine initiator-derived functionality and a functionality derived from a terminator, the terminator being devoid of any alkoxysilane, aryloxysilane, or aralkyloxysilane groups; an amorphous silica filler; and a vulcanization agent, wherein the lithium amine initiator-derived functionality is a residue of an initiator derived of the formula R'—N—R"—P—Li, wherein R' is a cyclic amine group having 3 to 18 ring carbon atoms and, together with the nitrogen, a ring of 4 to 19 atoms, wherein R" is selected from the group consisting of a divalent hydrocarbyl group of 2 to about 20 carbons, morpholine, and alkyl piperazine and wherein P is a diene-type oligomer having from 1 to about 100 diene monomer units, wherein the diene monomer is isoprene or 1,3-butadiene.

* * * * *